(12) United States Patent
Kismir et al.

(10) Patent No.: US 7,422,231 B2
(45) Date of Patent: Sep. 9, 2008

(54) AIR-BAG

(75) Inventors: Altay Kismir, Tilbury (CA); Simon Valkenburg, Hamburg (DE)

(73) Assignee: Autoliv Development AB, Vargarda (SE)

( * ) Notice: Subject to any disclaimer, the term of this patent is extended or adjusted under 35 U.S.C. 154(b) by 194 days.

(21) Appl. No.: 10/518,334

(22) PCT Filed: Jun. 12, 2003

(86) PCT No.: PCT/SE03/00975

§ 371 (c)(1),
(2), (4) Date: Sep. 16, 2005

(87) PCT Pub. No.: WO04/000609

PCT Pub. Date: Dec. 31, 2003

(65) Prior Publication Data

US 2006/0255571 A1 Nov. 16, 2006

(30) Foreign Application Priority Data

Jun. 21, 2002 (GB) ................................. 0214396.4

(51) Int. Cl.
B60R 21/16 (2006.01)
(52) U.S. Cl. .............. 280/728.1; 280/728.2; 280/730.2; 280/743.1
(58) Field of Classification Search ............... 280/728.1, 280/728.2, 730.2, 743.1, 749, 729
See application file for complete search history.

(56) References Cited

U.S. PATENT DOCUMENTS

| | | | |
|---|---|---|---|
| 5,149,130 A * | 9/1992 | Wooley et al. ............ | 280/743.1 |
| 6,073,961 A | 6/2000 | Bailey et al. | |
| 6,199,898 B1 | 3/2001 | Masuda et al. | |
| 6,203,058 B1 | 3/2001 | Elqadah et al. | |
| 6,227,561 B1 | 5/2001 | Jost et al. | |
| 6,231,073 B1 | 5/2001 | White, Jr. | |
| 6,273,456 B1 | 8/2001 | Heigl | |
| 6,293,581 B1 | 9/2001 | Saita et al. | |
| 6,299,199 B1 | 10/2001 | Bowers et al. | |
| 6,336,654 B1 | 1/2002 | Stein et al. | |
| 6,409,211 B1 | 6/2002 | Sheng et al. | |
| 6,428,037 B1 | 8/2002 | Bakhsh et al. | |
| 6,431,587 B1 | 8/2002 | O'Docherty | |
| 6,450,527 B2 * | 9/2002 | Kobayashi et al. .......... | 280/729 |
| 6,655,713 B2 * | 12/2003 | Tanase et al. ............. | 280/743.1 |
| 6,793,240 B2 * | 9/2004 | Daines et al. ............... | 280/729 |
| 6,869,099 B2 * | 3/2005 | Kawasaki et al. ........ | 280/730.2 |

(Continued)

FOREIGN PATENT DOCUMENTS

DE 100 21 576 11/2000

(Continued)

OTHER PUBLICATIONS

American Heritage Dictionary, 2nd College Edition, c. 1982, p. 583.*

Primary Examiner—Eric Culbreth
(74) Attorney, Agent, or Firm—Brinks Hofer Gilson & Lione

(57) ABSTRACT

An air-bag comprising an inflatable element having an inflatable region and a gas inlet throat extending from the inflatable region, a gusset of excess fabric being present in the region proximate to the junction between the gas inlet throat and the inflatable region.

17 Claims, 4 Drawing Sheets

U.S. PATENT DOCUMENTS

| | | |
|---|---|---|
| 2001/0019201 A1 | 9/2001 | Masuda et al. |
| 2001/0045729 A1 | 11/2001 | Mueller |
| 2002/0014762 A1 | 2/2002 | Bakhsh et al. |
| 2002/0020991 A1 | 2/2002 | Tanase et al. |
| 2002/0036396 A1 | 3/2002 | Fischer |
| 2002/0056974 A1 | 5/2002 | Webert |
| 2002/0105173 A1 | 8/2002 | Saderholm et al. |
| 2002/0125693 A1 | 9/2002 | Alsup et al. |
| 2002/0163167 A1 | 11/2002 | Hill |
| 2002/0175502 A1 | 11/2002 | Tesch et al. |
| 2002/0195804 A1 | 12/2002 | Hess et al. |

FOREIGN PATENT DOCUMENTS

| | | | |
|---|---|---|---|
| EP | 1 238 865 | | 9/2002 |
| JP | 6-227344 | * | 6/1994 |
| JP | 9-58392 | | 3/1997 |
| JP | 2000 335356 | | 12/2000 |
| WO | WO 98/26959 | | 6/1998 |
| WO | WO 99/42333 | | 8/1999 |
| WO | WO 03/018372 | | 3/2003 |
| WO | WO 03/051679 | | 6/2003 |
| WO | WO 03/051680 | | 6/2003 |
| WO | WO 03/078214 | | 9/2003 |

* cited by examiner

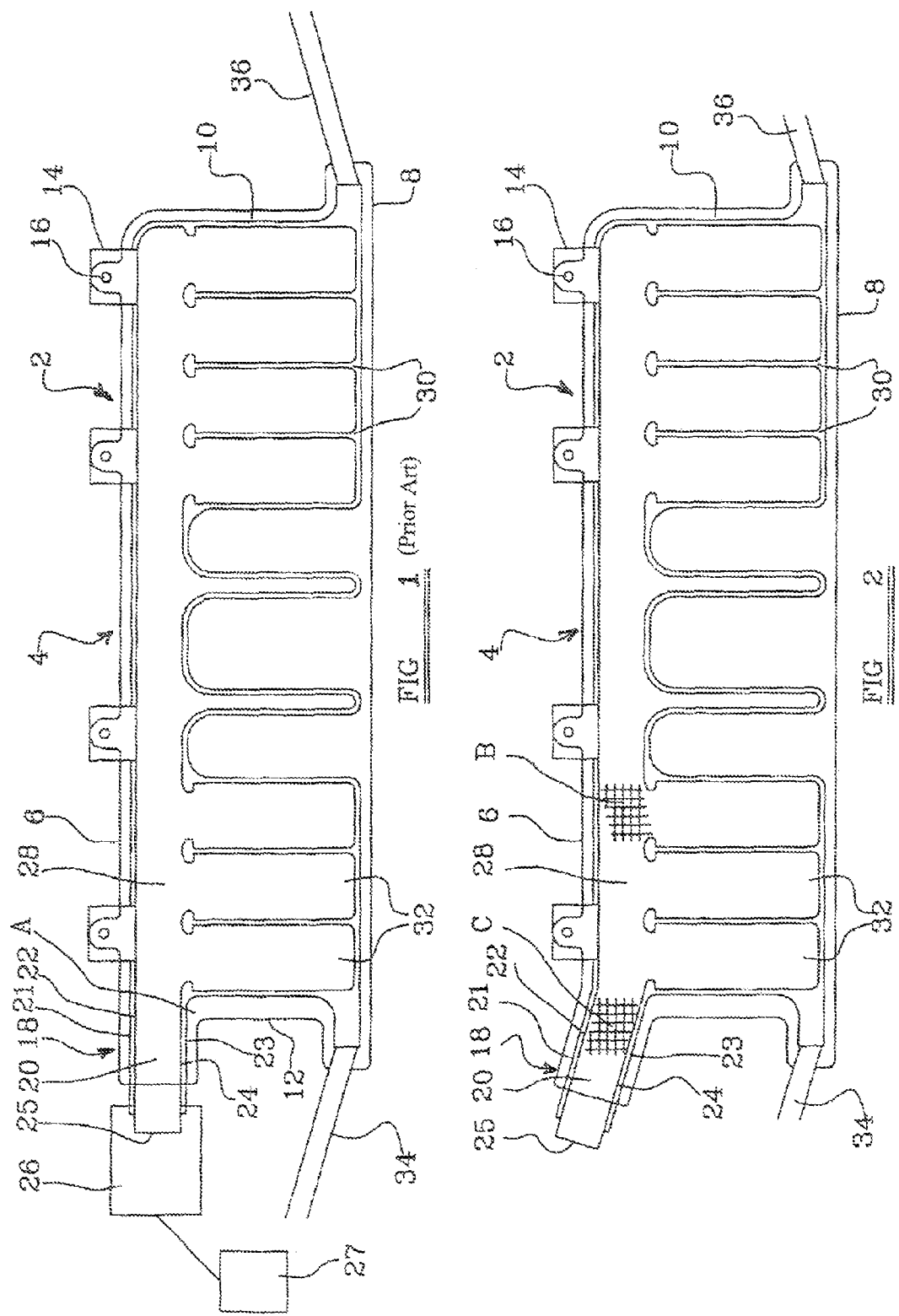

AIR-BAG

CROSS REFERENCE TO RELATED APPLICATION

This application claims priority to PCT/SE03/000975, filed Jun. 12, 2003, and GB 0214396.4, filed Jun. 21, 2002.

BACKGROUND OF THE INVENTION

The present invention relates to an air-bag.

It has been proposed to provide an air-bag which has a plurality of inflatable regions or chambers which are to be supplied with gas from a gas generator. One example of such an air-bag is a so-called "inflatable curtain" which is adapted to be mounted in the roof line of the vehicle above the door openings of the vehicle, and which is also adapted, when an accident occurs, to be deployed to lie adjacent to the window openings formed in the door, thus forming a protective curtain located between the occupants of the vehicle and the side of the vehicle. Such inflatable curtains are intended to provide protection to the occupants of the vehicle in the event of a side impact or roll-over situation.

Inflatable curtains must be inflated very quickly, necessitating a high gas flow rate into the bag. The forces generated by this very high gas flow rate may cause the bag to tear. Continued inflation may result in the tear propagating, therefore degrading the performance characteristic of the air-bag. Certain areas of the air-bag have been found to be more prone to tearing than others, and in certain air-bag designs it has been found that even adding extra stitching does not result in the avoidance of such tearing.

The invention seeks to provide an improved air-bag.

SUMMARY OF THE INVENTION

According to the present invention, there is provided an air-bag comprising an inflatable element having an inflatable region and a gas inlet throat extending from the inflatable region, a gusset of excess fabric being present in the region proximate to the junction between the gas inlet throat and the inflatable region.

Preferably, the inflatable region and the gas inlet throat each have at least two side edges, one side edge of the gas inlet throat being substantially aligned with one side of the inflatable region, the other side edge of the gas inlet throat being substantially perpendicular to another side edge of the inflatable region. The gusset is located adjacent the junction of the other side edge of the gas inlet throat and another side edge of the inflatable region.

Alternatively, the gas inlet throat is sharply bent or cranked and extends from a point between the ends of one side edge of the inflatable region, one part of the throat being substantially parallel with one side edge.

Conveniently, the gusset is formed integrally with the air-bag.

Advantageously, the inflatable region has a gas flow passage formed within it, the gas flow passage defining a first axis, and at least part of the gas inlet throat configured to be connected to an inflator defines a second axis, the air-bag having a first and a second configuration, the axis of the gas flow passage and the axis of the gas inlet throat defining an oblique angle therebetween in the first configuration, the two axes being co-aligned or parallel and the gusset of excess fabric being present in the region proximate to the junction between the gas inlet throat and the inflatable region in the second configuration.

Preferably, the inflatable region incorporates a plurality of cells defined by seams in the air-bag, the cells communicating with the gas flow passage.

Conveniently, straps extend from spaced apart points on the inflatable region, each strap having a free end adapted to be secured to a respective anchoring point formed on the interior of a vehicle.

Advantageously, the air-bag is formed from woven fabric.

Preferably, the woven fabric has warp and weft yarns, the axis defined by the gas flow passage being aligned with either the warp yarns or the weft yarns of the woven fabric, and the axis defined by the gas inlet throat being inclined at the oblique angle relative to either the warp yarns or the weft yarns of the fabric.

Conveniently, the oblique angle is between 10 and 20 degrees.

Advantageously, the oblique angle is 15 degrees.

The invention further provides for method for processing an air-bag for mounting in a vehicle, the air-bag comprising an inflatable element having an inflatable region and a gas inlet throat extending from a side edge of the inflatable region, the inflatable region having a gas flow passage formed within it, the gas flow passage defining a first axis; said gas inlet throat having a part configured to an inflator, which part defines a second axis, the gas inlet throat initially extending from the inflatable region, the method comprising the step of re-positioning the gas inlet throat from a first condition in which the axis defined by the gas inlet throat is inclined relative to the axis defined by the gas flow passage to a second condition in which the axis defined by the gas inlet throat is aligned with the axis defined by the gas flow passage, thereby forming a gusset of excess material, the gusset being located adjacent the junction of the gas inlet throat and the side edge of the inflatable region.

Preferably, the method further comprises the step of concertina-folding the inflatable region.

Conveniently, the concertina folds are parallel to the axis defined by the gas flow passage of the inflatable region.

Advantageously, the method further comprises the step of encasing the air-bag in a sleeve or housing.

Preferably, the method further comprises the step of locating parts of the air-bag to extend through apertures formed in the sleeve or housing such that the parts protrude from the sleeve or housing.

Conveniently, the method further comprises the step of connecting the gas inlet throat to a gas generator.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1 is a diagrammatic side view of a prior art air-bag of the inflatable curtain type connected to a gas generator and sensor arrangement, FIG. 2 is a diagrammatic side view of a presently preferred embodiment of an air-bag of the invention.

DETAILED DESCRIPTION OF THE INVENTION

Figure 3:
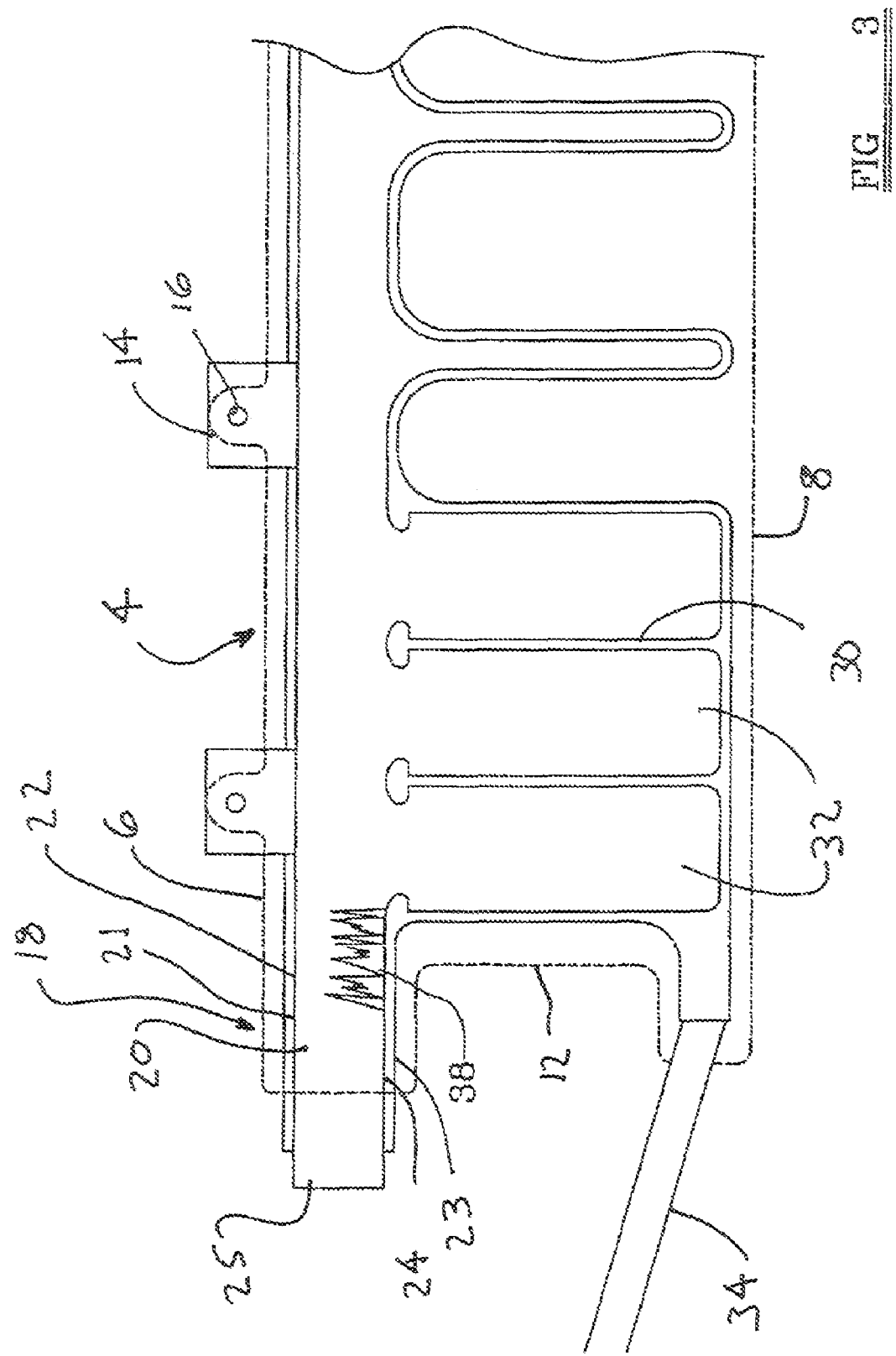
FIG. 3 is an enlarged diagrammatic side view of a region of the air-bag of FIG. 2 shown in the first stage of preparation for mounting in a vehicle.

The prior art air-bag 2 of FIG. 1 is formed from two superimposed layers of fabric, each layer of fabric having the same outer peripheral shape. The two layers of fabric may be secured together to form seams by stitching. Alternatively, the entire bag may be constructed using a one piece weaving technique, familiar to those skilled in the art, in which the seams are integrally woven into the bag.

The inflatable curtain has a substantially rectangular main inflatable region 4, defined by four side edges: an upper side edge 6, lower side edge 8 and two opposed side edges 10 and 12. The upper and lower side edges 6, 8 are longer than the two opposed side edges 10, 12.

A plurality of mounting tabs 14 extend from the upper side edge 6 of the air-bag. Each of the mounting tabs 14 has a hole 16 formed therethrough to facilitate the mounting of the air-bag in a vehicle. The mounting tabs 14 are evenly spaced along the upper side edge 6 of the substantially rectangular main inflatable region of the air-bag.

A projecting portion 18 is formed at one end of the substantially rectangular main inflatable region 4, and extends from an upper corner of the region 4 in a direction parallel to the upper side edge 6 of the air-bag and perpendicular to a side edge 12 of the air-bag. The projecting portion 18 is formed from the fabric used to form the main inflatable region 4 and thus the air-bag is formed integrally.

The projecting portion 18 defines a substantially rectangular shaped gas inlet throat 20 formed between an upper side edge 21 and lower side edge 23. The upper side edge 21 and the lower side edge 23 of the gas inlet throat are each constituted by a respective seam 22, 24. The gas inlet throat 20 is linear and defines a first axis. One end 25 of the gas inlet throat 20 which is remote from the rectangular region of the air-bag is connected to a gas generator 26. This gas generator is connected to a collision and roll-over sensor 27. The other end of the gas inlet throat 20 communicates with a gas flow passage 28 formed in the interior of the rectangular main inflatable region 4 of the air-bag. The gas flow passage 28 is generally linear and runs along the top of the air-bag adjacent to the upper side edge 6. The gas flow passage 28 defines a second axis. The axis of the gas inlet throat 20 and the axis of the gas flow passage 28 are co-aligned.

A plurality of vertically extending seams 30 define a row of inflatable cells 32, each cell having a substantially vertical axis which intersects the lower edge 8 of the rectangular region of the air-bag. The top of each of the cells 32 communicates with the gas flow passage 28. When inflated, these cells 32 adopt a substantially cylindrical profile.

A pair of straps 34, 36 extend from two spaced apart points on the lower side edge 8 of the air-bag. Each strap has a free end which is adapted to be secured or mounted to a respective anchoring point formed on the interior of a vehicle in which the air-bag is to be mounted.

In the event that the vehicle in which the air-bag 2 is mounted is involved in a side-impact collision or a rollover, the sensor 27 generates a signal which is sent to the gas generator 26, causing the gas generator to generate and discharge gas. The gas flows through the gas inlet throat 20 and along the gas flow passage 28 and hence into the cells 32, which are inflated.

As the cells inflate, they adopt a substantially cylindrical profile, resulting in the lower edge of the bag 8 decreasing in length. This reduction in length creates a line of tension between the anchoring points to which the straps 34, 36 are secured which acts to hold the bag in place. The substantially vertical axes of the cells 32 intersect this line of tension.

It has been found that tearing may occur in the throat region of this type of air-bag. In particular tearing has been found to occur in the region 'A' shown in FIG. 1, that is, in the region between the lower side edge 23 of the gas inlet throat 20 and the side edge 12 of the air-bag from which the gas inlet throat 20 extends.

Turning to FIG. 2, a presently preferred embodiment of an air-bag according to the invention is illustrated in a first configuration. The basic design of the air-bag is very similar to that of FIG. 1. Thus like parts have been given like references and will not be re-described in detail.

In the embodiment of FIG. 2 the air-bag in the first configuration is flat and the gas inlet throat 20 is not co-aligned with the gas flow passage 28, but is inclined upwardly above the upper side edge 6 of the air-bag.

The axes defined by the gas inlet throat 20 and the gas flow passage 28 are not co-aligned, but are at an oblique angle relative to each other. An oblique (as opposed to a right) angle is formed in the area A between the lower side edge 23 of the gas inlet throat 20 and the side edge of the air-bag 12. The preferred angle between the axis of the gas inlet throat 20 and the axis of the gas flow passage 28 is in the range of 10 to 20 degrees, the most preferred angle being 15 degrees.

The upper, lower and opposed side edges 6, 8, 10, and 12 of the rectangular region 4 of the air-bag, together with the seams 30 formed in the air-bag and the axis defined by the gas flow passage 20 align with either the warp or the weft yarns of the fabric (shown at region B) from which the bag is made, and are thus perpendicular to the other of either the warp or weft yarns.

The axis of the gas inlet throat 20 defines respective oblique angles relative to both the warp and weft yarns of the fabric, shown at region C.

In processing the air-bag 2 of FIG. 2 for mounting in a vehicle, the air-bag is initially in the configuration as shown in and described with reference to FIG. 2. Subsequently, the gas inlet throat 20 is re-positioned so that the axis of the gas inlet throat 20 and the axis of the gas flow passage 28 are co-aligned, so that the air-bag has a second configuration as shown in FIG. 3. Correspondingly, a right angle is created between the lower side edge 23 of the gas inlet throat 20 and the side edge 12 of the rectangular main inflatable region of the air-bag.

Thus, the air-bag of FIG. 3 is configured to have substantially the same overall configuration as the air-bag of FIG. 1, and it may readily be mounted in a vehicle in the same manner as the air bag shown in and described with reference to FIG. 1.

As a result of the re-positioning of the gas inlet throat 20, with its axis aligned with that of the gas flow passage 28, a wrinkled region or gusset 38 of excess fabric is formed along the lower edge 23 of the gas inlet throat where it joins the rectangular main inflatable region 4 of the air-bag. "Gussett" as used in this specification and the claims means a wrinkled region of excess fabric formed along a lower region of the gas inlet throat where it joins the rectangular main inflatable region of the airbag, thus permitting this region to expand upon inflation to cause an obliquely angled gas inlet throat.

Figure 4:
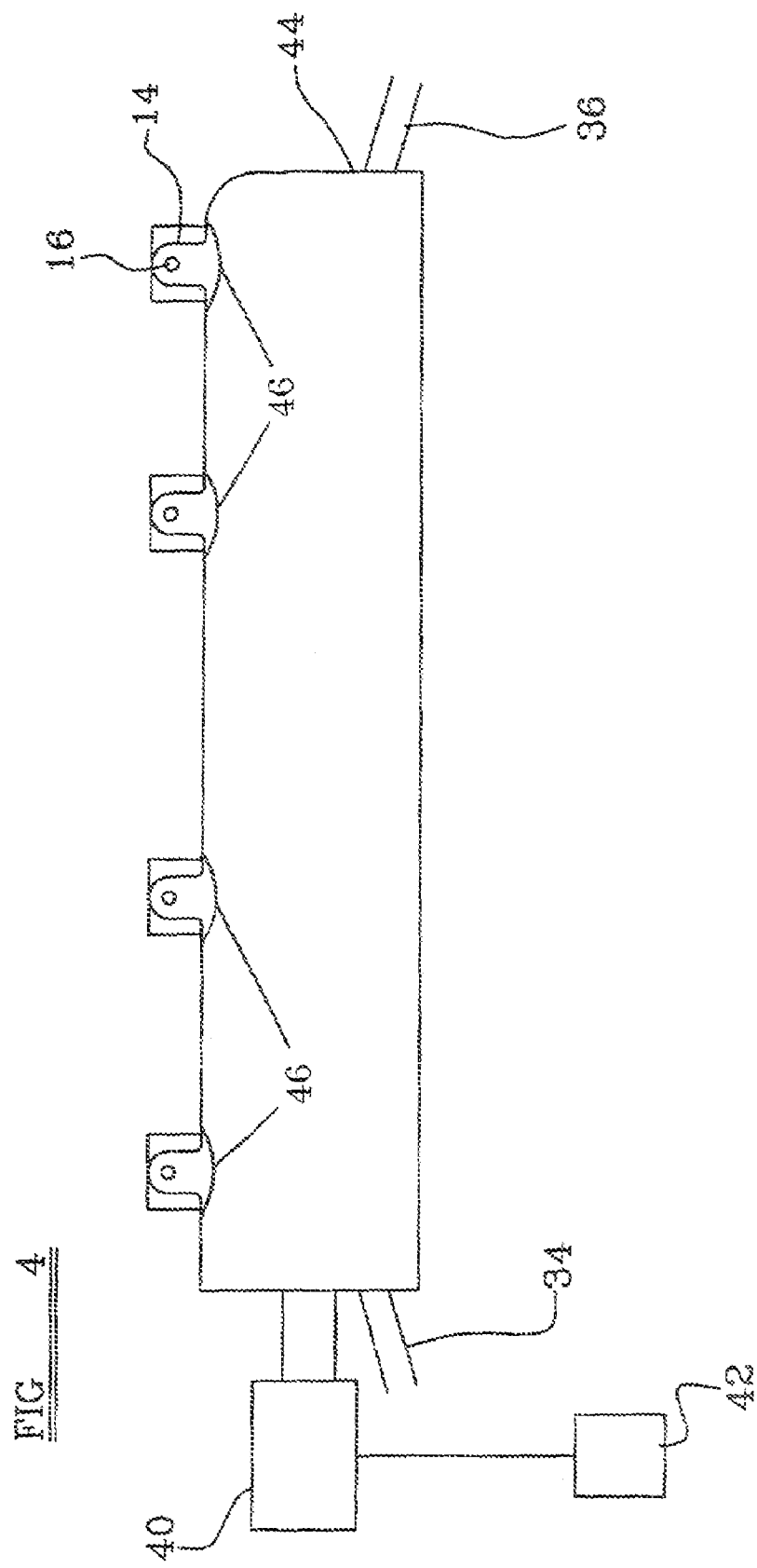
FIG. 4 is a diagrammatic side view of the air-bag of FIG. 2 in the final stage of preparation for mounting in a vehicle connected to a gas generator and sensor arrangement.

The air-bag may be attached to a gas generator 40 which in turn may be connected to a collision and roll-over sensor 42, as shown in FIG. 4. The air-bag may be folded in a concertina manner with folds parallel to the axis defined by the gas flow passage. The folded air-bag is encased within a sleeve or a housing 44. A plurality of mounting tabs 14 extend through and protrude from apertures 46 (apertures 46 are schematic) formed in the upper side edge of the sleeve or housing, and the straps 34, 36 extend from the air-bag and protrude through the ends of the sleeve or housing 44.

The mounting tabs 14 may be mounted by the holes 16 therein to anchoring points within the roof line of a vehicle, and straps 34 and 36 may be secured to respective anchoring points within the vehicle, which are preferably on the A and C posts of the vehicle, or alternatively on the A and B posts of the vehicle.

In the event that the vehicle in which the air-bag is mounted is involved in a side-impact collision or a roll-over, the sensor 42 triggers the gas generator 40 to generate gas which is subsequently passed through the gas inlet throat 20 and into the gas flow passage 28 of the air-bag.

The gas will flow initially into the gas flow passage 28 of the air-bag and subsequently into the cells 32.

As the gas flows into the cells 32, the air-bag inflates to occupy a position beneath the sleeve 44 or housing. The individual cells 32 of the air-bag inflate, and the lower edge 8 of the air-bag decreases in length, creating a line of tension between the anchoring points to which the straps 34, 36 are attached.

It has been found that due to the excess fabric, the wrinkled region or gusset 38 is not particularly susceptible to tearing. The presence of this gusset 38 increases the ability of the fabric to elongate, thus distributing the load applied across a greater area of material and to a greater amount of warp and weft strands.

Furthermore, a buffer zone is provided by the gusset 38 which acts to absorb the force applied by gas on inflation of the air-bag and minimize the risk of tearing.

It is also believed that an angle or corner, such as the angle or corner between the lower side edge 23 of the gas inlet throat 20 and the side edge 12 of the air-bag is intrinsically stronger if one of the elements defining the angle or corner is at an oblique angle to the warp or weft yarns.

Whilst the invention has been described above with reference to an embodiment in which the gas inlet throat for the air-bag is substantially aligned with the gas flow passage within the air-bag, it has been proposed to provide air-bags of the general form as shown in FIGS. 1 to 3, with a gas inlet throat which is mounted on the upper edge of the inflatable region, typically at a substantially central position. Locating the gas inlet throat in such a position facilitates rapid inflation of the air-bag.

Figure 5:
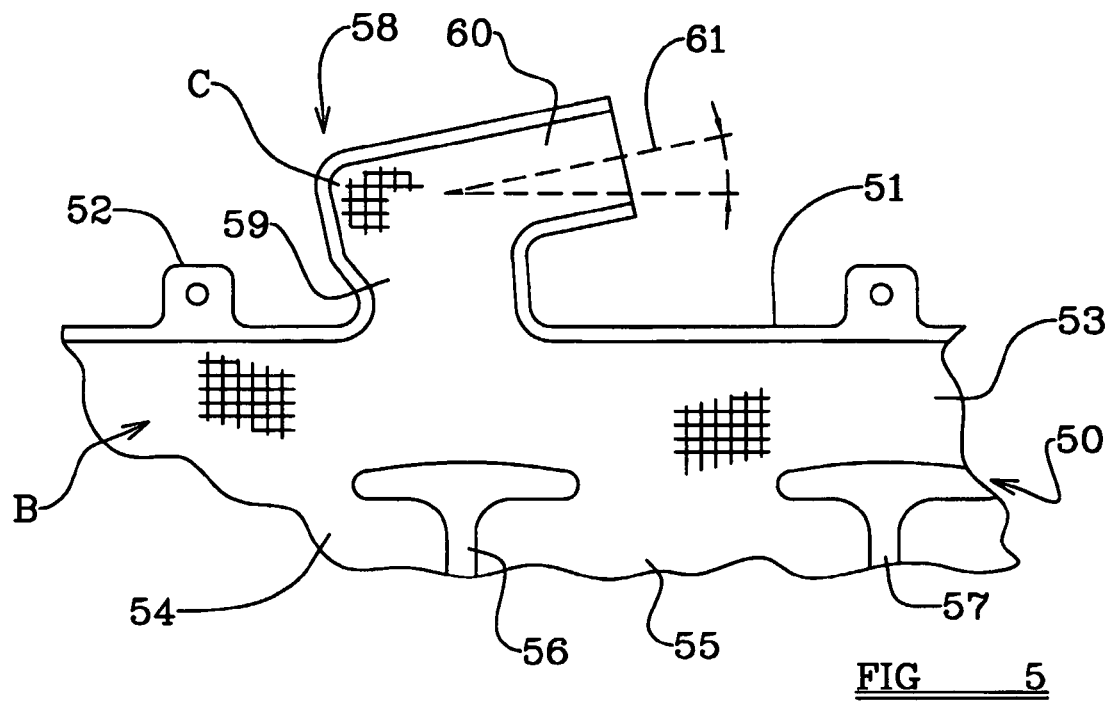
FIG. 5 is a diagrammatic side view of a region of a further form of air-bag.
Figure 6:
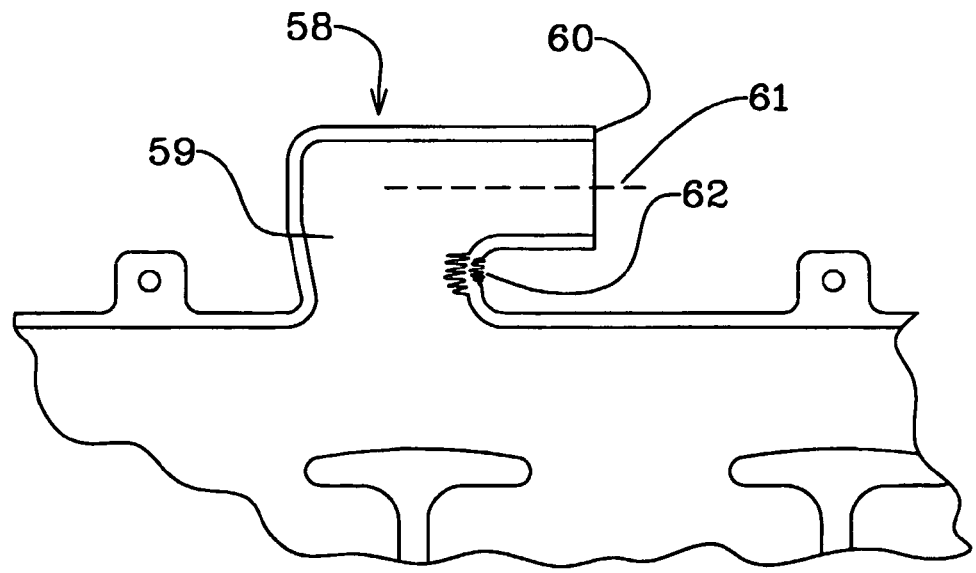
FIG. 6 is a diagrammatic side view, corresponding to FIG. 5, showing the air-bag in a first stage of preparation for mounting in a vehicle.

FIGS. 5 and 6 illustrate an air-bag 50 of this general type. The air-bag 50 has an upper side edge 51 provided with a plurality of spaced-apart mounting tabs 52. Adjacent the upper edge 51 within the inflatable region of the air-bag, is a gas flow passage 53 which extends parallel with the upper edge 51. A plurality of cells 54, 55 are defined within the inflatable region by dividing seams 56, 57, as in the embodiment described above.

A gas inlet throat 58 is provided which extends from the upper edge 51 of the air-bag 50. The throat is a cranked, i.e. sharply bent, throat of generally "L" form having two arms 59, 60. The arm 60 defines an axis 61 and, in an initial condition of the air-bag, the arm 60 is inclined by an angle relative to the upper edge 51 of the air-bag and thus relative to the axis of the gas flow passage 53. As can be seen in region B, the warp and weft yarns of the fabric are parallel and orthogonal to the upper edge and the axis of the gas flow passage 53. The angle made by the axis 61 of the arm 60 of the throat 58 is in the region of 10 to 30 degrees, the most preferred angle being 20 degrees. As can be seen at regions C, the axis 61 makes the same angle with regard to the warp and weft yarns.

It is to be appreciated that in processing the air-bag for mounting in a vehicle, the air-bag is initially in the configuration shown in and described with reference to FIG. 5. Subsequently, the arm 60 of the gas inlet throat is re-positioned so that the axis 61 of the gas inlet throat is parallel with the axis of the upper edge 51 and thus the axis of the gas flow passage 53, as shown in FIG. 6. As a consequence of this re-positioning of the gas inlet throat, a wrinkled region or gusset 62 of excess fabric is created on that part of the gas inlet throat 58 which lies between the arm 60 and the upper edge 51 of the air-bag 50.

Again the air-bag 50 is to be attached to a gas generator which is attached to the end of the arm 60 of the gas inlet throat 58. As in the previously-described embodiment, the mounting tabs 52 are used to secure the air-bag within the roof line of a vehicle. Also, it is to be understood that the wrinkled region or gusset 62 is not particularly susceptible to tearing due to the presence of the excess fabric.

While the above description constitutes the preferred embodiment of the present invention, it will be appreciated that the invention is susceptible to modification, variation and change without departing from the proper scope and fair meaning of the accompanying claims.

The invention claimed is:

1. An air-bag comprising an inflatable element having an inflatable region and a gas inlet throat joined to and extending from the inflatable region, the gas inlet throat configured for receiving gas to inflate the inflatable region, a gusset defined by a wrinkled region of excess fabric and being present in the region proximate to the junction between the gas inlet throat and the inflatable region, wherein the gusset elongates to absorb force that is applied by the gas to the inflatable element when the inflatable region is inflated.

2. An air-bag according to claim 1, wherein the inflatable region and the gas inlet throat each have at least a first and a second side edge, the first side edge of the gas inlet throat being substantially aligned with a first side of the inflatable region, the second side edge of the gas inlet throat being substantially perpendicular to a second side edge of the inflatable region, the gusset being located adjacent the junction of the second side edge of the gas inlet throat and the second side edge of the inflatable region.

3. An air-bag according to claim 1, wherein the gas inlet throat is cranked and extends from a point between opposed ends of a side edge of the inflatable region, one part of the throat being substantially parallel with the side edge.

4. An air-bag according to claim 1 wherein the gusset is formed integrally with the air-bag.

5. An air-bag according to claim 1 wherein the inflatable region has a gas flow passage formed within it, the gas flow passage defining a first axis, and at least part of the gas inlet throat configured to be connected to an inflator defines a second axis, the air-bag having a first and a second configuration, the axis of the gas flow passage and the axis of the gas inlet throat defining an oblique angle therebetween in the first configuration, the axes being co-aligned or parallel and the gusset being present in the region proximate to the junction between the gas inlet throat and the inflatable region in the second configuration.

6. An air-bag according to claim 5, wherein the inflatable region incorporates a plurality of cells defined by seams in the air-bag, the cells communicating with the gas flow passage.

7. An air-bag according to claim 6, wherein straps extend from spaced apart points on the inflatable region, each strap having a free end adapted to be secured to a respective anchoring point formed on the interior of a vehicle.

8. An air-bag according to claim 5 wherein the oblique angle is between 10 and 20 degrees.

9. An air-bag according to claim 8 wherein the oblique angle is 15 degrees.

10. An air-bag according to claim 1 wherein the air-bag is formed from woven fabric.

11. An air-bag according to claim 10 wherein the woven fabric has warp and weft yarns, and further wherein a gas flow passage formed within the inflatable region defines an axis which is aligned with either the warp yarns or the weft yarns of the woven fabric, and further wherein the axis defined by the gas inlet throat is inclined at an oblique angle relative to either the warp yarns or the weft yarns of the fabric.

12. A method for processing an air-bag for mounting in a vehicle, the air-bag comprising an inflatable element having an inflatable region and a gas inlet throat joined to and extending from a side edge of the inflatable region, the inflatable region having a gas flow passage formed within it, the gas flow passage defining a first axis; the gas inlet throat communicating with an inflator and defining a second axis, the gas inlet throat initially extending from the inflatable region, the method comprising the step of re-positioning the gas inlet throat from a first condition in which the axis defined by the gas inlet throat is inclined relative to the axis defined by the gas flow passage to a second condition in which the axis defined by the gas inlet throat is aligned with the axis defined by the gas flow passage, thereby forming a gusset of excess material, the gusset being located adjacent the junction of the gas inlet throat and the side edge of the inflatable region.

13. A method of processing an air-bag according to claim 12, further comprising the step of concertina-folding the inflatable region.

14. A method of processing an air-bag according to claim 13, wherein the concertina folds are parallel to the axis defined by the gas flow passage of the inflatable region.

15. A method of processing an air-bag according to claim 12 further comprising the step of encasing the air-bag in a sleeve or housing.

16. A method of processing an air-bag according to claim 15, further comprising the step of locating parts of the air-bag to extend through apertures formed in the sleeve or housing such that the parts protrude from the sleeve or housing.

17. A method of processing an air-bag according to claim 12 further comprising the step of connecting the gas inlet throat to a gas generator.

* * * * *